United States Patent
Misumi et al.

(10) Patent No.: US 12,492,289 B2
(45) Date of Patent: Dec. 9, 2025

(54) PREPREG, LAMINATE, AND MOLDING

(71) Applicant: Toray Industries, Inc., Tokyo (JP)

(72) Inventors: Jun Misumi, Ehime (JP); Masato Honma, Ehime (JP); Kyoko Shinohara, Ehime (JP); Noriyuki Hirano, Ehime (JP)

(73) Assignee: Toray Industries, Inc., Tokyo (JP)

( * ) Notice: Subject to any disclaimer, the term of this patent is extended or adjusted under 35 U.S.C. 154(b) by 1052 days.

(21) Appl. No.: 17/608,237

(22) PCT Filed: May 15, 2020

(86) PCT No.: PCT/JP2020/019467
§ 371 (c)(1),
(2) Date: Nov. 2, 2021

(87) PCT Pub. No.: WO2020/235485
PCT Pub. Date: Nov. 26, 2020

(65) Prior Publication Data
US 2022/0251317 A1    Aug. 11, 2022

(30) Foreign Application Priority Data

May 23, 2019 (JP) ................. 2019-097031
May 23, 2019 (JP) ................. 2019-097033

(51) Int. Cl.
*C08J 5/24* (2006.01)

(52) U.S. Cl.
CPC .......... *C08J 5/243* (2021.05); *C08J 2323/12* (2013.01); *C08J 2363/00* (2013.01); *C08J 2367/02* (2013.01); *C08J 2371/10* (2013.01); *C08J 2377/02* (2013.01)

(58) Field of Classification Search
None
See application file for complete search history.

(56) References Cited

U.S. PATENT DOCUMENTS

| | | | |
|---|---|---|---|
| 8,415,007 B2 | 4/2013 | Honma et al. | |
| 2009/0208721 A1* | 8/2009 | Tsuchiya | B29C 45/14786 264/250 |
| 2012/0108132 A1* | 5/2012 | Fang | C08J 5/248 428/221 |
| 2017/0282516 A1* | 10/2017 | Teranishi | C08G 59/226 |
| 2019/0015718 A1* | 1/2019 | Takeuchi | A63B 53/10 |
| 2019/0225764 A1* | 7/2019 | Harada | C08L 63/00 |
| 2019/0330464 A1 | 10/2019 | Ushiyama et al. | |
| 2022/0289922 A1* | 9/2022 | Tajima | C08J 5/243 |
| 2023/0313007 A1* | 10/2023 | Shiraishi | H01M 50/121 428/355 CN |

FOREIGN PATENT DOCUMENTS

| | | | |
|---|---|---|---|
| EP | 2623533 A1 | 8/2013 | |
| JP | 01104625 A | 4/1989 | |
| JP | 08259713 A | 10/1996 | |
| JP | 08337707 A | 12/1996 | |
| JP | 10138354 A | 5/1998 | |
| JP | 2003201388 A | 7/2003 | |
| JP | 3906319 B2 | 4/2007 | |
| JP | 2012051989 A | 3/2012 | |
| JP | 2018161801 A | 10/2018 | |
| JP | 2019038939 A | 3/2019 | |
| WO | 2004060658 A1 | 7/2004 | |
| WO | 2018066600 A1 | 4/2018 | |
| WO | 2018117214 A1 | 6/2018 | |

OTHER PUBLICATIONS

Momentive Product Selector: Coatings/ Civil Engineering/ Adhesives, Epikote Resins and Heloxy Modifiers (Year: 2013).*
International Search Report and Written Opinion for International Application No. PCT/JP2020/019467, dated Aug. 4, 2020, 7 pages.
Extended European Search Report for European Application No. 20808920.1, dated May 8, 2023, 8 pages.

* cited by examiner

*Primary Examiner* — Michael J Feely
(74) *Attorney, Agent, or Firm* — Buchanan Ingersoll & Rooney PC

(57) ABSTRACT

An object of the present invention is to provide a prepreg and a laminate for producing a laminate suitable as a structural material, which have excellent joining strength and interlaminar fractural toughness values and can be firmly integrated with another structural member by welding. The present invention provides a prepreg including the following structural components, [A] reinforcing fibers, [B] an epoxy resin, and [C] a thermoplastic resin, wherein all epoxy resins included in [B] have an average epoxy value of 2.0 meq./g or more and 5.0 meq./g or less, [C] is present in a surface of the prepreg, and the reinforcing fibers [A] are present, which are included in a resin area including [B] and a resin area including [C] across an interface between the two resin areas.

7 Claims, 2 Drawing Sheets

PREPREG, LAMINATE, AND MOLDING

CROSS REFERENCE TO RELATED APPLICATIONS

This is the U.S. National Phase application of PCT/JP2020/019467, filed May 15, 2020, which claims priority to Japanese Patent Application No. 2019-097031, filed May 23, 2019 and Japanese Patent Application No. 2019-097033, filed May 23, 2019, the disclosures of each of these applications being incorporated herein by reference in their entireties for all purposes.

FIELD OF THE INVENTION

The present invention relates to a prepreg including reinforcing fibers, an epoxy resin, and a thermoplastic resin; a laminate including reinforcing fibers, a thermoplastic resin, and a cured product of an epoxy resin; and a molding.

BACKGROUND OF THE INVENTION

Fiber-reinforced composite materials in which a thermosetting resin or a thermoplastic resin is used as a matrix and is combined with reinforcing fibers such as carbon fibers or glass fibers are lightweight and have excellent dynamic characteristics such as strength and rigidity, heat resistance, and corrosion resistance, and therefore have been applied to many fields such as aerospace, automobiles, railway vehicles, ships, civil engineering and construction, and sporting goods. These fiber-reinforced composite materials, however, are unsuitable for producing parts or structures having a complicated shape in a single molding process, and in the above applications, it is necessary to produce a member including a fiber-reinforced composite material and then to integrate the member with the same or different kind of member. Mechanical joining methods using bolts, rivets, or screws, and joining methods using an adhesive are used as a method for integrating the fiber-reinforced composite material including the reinforcing fibers and the thermosetting resin with the same or different kind of member. The mechanical joining method has disadvantages in which a production process is prolonged and a production cost is increased because a process in which a joint is previously processed, such as drilling, is necessary, and the strength of the material is deteriorated because of the drilling. The joining method using the adhesive has disadvantages in which the production process is prolonged because the method requires a bonding process including preparation of an adhesive and coating of the adhesive, and a curing process, and the sufficient reliability in bonding strength cannot be obtained.

To the fiber-reinforced composite material using the thermoplastic resin as a matrix can be applied a method for joining members by welding, in addition to the mechanical joining method and the joining method using an adhesive, and thus the time required for joining the members may possibly be shortened. On the other hand, joining strength in a mode of tensile shear (in-plane shear) or out-of-plane tension, and joining strength against impact are required as the joining strength for a structural material, but there is a problem in which sufficient reliability cannot be obtained for all of the joining strengths.

Here, Patent Document 1 shows a method for joining a fiber-reinforced composite material including a thermosetting resin and reinforcing fibers through an adhesive.

Patent Document 2 shows a method for integrating a member formed from a thermoplastic resin with a member formed from a fiber-reinforced composite material including a thermosetting resin. That is, a thermoplastic resin film is laminated on a surface of a prepreg sheet including the reinforcing fibers and the thermosetting resin, and heated and pressurized to obtain a fiber-reinforced composite material. Thereafter, the obtained fiber-reinforced composite material is put in a mold, a thermoplastic resin is injection-molded, and the thermoplastic resin member, formed by the injection molding, is joined to the fiber-reinforced composite material.

In addition, Patent Document 3 shows a method for producing a laminate in which a thermoplastic resin adhesive layer is formed on a surface of a composite material including a thermosetting resin and reinforcing fibers, and describes that the laminate exhibits an adhesion effect with another member through the thermoplastic resin.

Patent Document 4 shows a prepreg including reinforcing fibers and a thermosetting resin, and having particles, fibers, or films including a thermoplastic resin disposed on a surface layer of the prepreg, and a fiber-reinforced composite material thereof.

PATENT DOCUMENTS

Patent Document 1: Japanese Patent Laid-Open Publication No. 2018-161801
Patent Document 2: Japanese Patent Laid-Open Publication No. 10-138354
Patent Document 3: Japanese Patent No. 3906319
Patent Document 4: Japanese Patent Laid-Open Publication No. 8-259713

SUMMARY OF THE INVENTION

The method disclosed in Patent Document 1, however, is a method for joining the fiber-reinforced composite materials including the reinforcing fibers and the thermosetting resin to each other using the adhesive, and welding cannot be applied to the method for joining the fiber-reinforced composite materials as they are, because the thermosetting resin is used as a matrix resin. There is a problem of the joining process needing time because the curing of the adhesive needs time, and further, the joining strength exhibited is insufficient.

According to the method described in Patent Document 2, the joining strength is insufficient at the joint between the thermosetting resin and the thermoplastic resin film in the fiber-reinforced composite material.

The fiber-reinforced composite material according to Patent Document 3 can be integrated by welding through the thermoplastic resin, and exhibits excellent static joining strength, but has insufficient joining strength against impact.

Patent Document 4 shows that interlaminar fractural toughness values are improved by the particles, fibers or films including the thermoplastic resin, but according to this method, the joining strength is insufficient at a boundary between the thermosetting resin and the thermoplastic resin in the fiber-reinforced composite material.

Therefore, an object of the present invention is to provide a prepreg, a laminate, and an integrated molding, which can be joined to the same or different kind of member by welding, exhibit excellent tensile shear joining strength, out-of-plane tensile joining strength, and impact joining strength, and provide a laminate suitable as a structural material.

In order to solve such problems, the prepreg according to embodiments of the present invention has the following constitutions. That is, it is a prepreg including the following structural components [A], [B], and [C], wherein all epoxy resins included in [B] have an average epoxy value of 2.0 meq./g or more and 5.0 meq./g or less, [C] is present in a surface of the prepreg, and reinforcing fibers [A] are present, which are included in a resin area including [B] and a resin area including [C] across an interface between the two resin areas:

[A] reinforcing fibers;
[B] an epoxy resin; and
[C] a thermoplastic resin.

Furthermore, the laminate according to embodiments of the present invention is a laminate having the following configuration. That is, it is a laminate including a layer including the following structural components [A], [C], and [D], wherein all epoxy resin included in [D] has an average epoxy value of 2.0 meq./g or more and 5.0 meq./g or less, and the reinforcing fibers [A] are present, which are included in a resin area including [C] and a resin area including [D] across an interface between the two resin areas:

[A] reinforcing fibers;
[C] a thermoplastic resin; and
[D] a cured product of an epoxy resin.

The prepreg of the present invention uses the epoxy resin and the thermoplastic resin wherein and they are firmly joined to each other, and the prepreg can be favorably welded to the same or different kind of member, and thus the time required for the joining process can be shortened and the molding speed of the structural members can be increased, as compared with a conventional fiber-reinforced composite material including a thermosetting resin and reinforcing fibers. Furthermore, the excellent tensile shear joining strength, out-of-plane tensile joining strength, and impact bonding strength are exhibited, and a laminate excellent as a structural material is obtained. The laminate of the present invention exhibits excellent performance as a structural body when it is applied to aircraft structural members, blades of a windmill, automobile structural members, and computer applications such as IC trays and housings of laptop computers, and the use of the prepreg of the present invention makes it possible to greatly reduce the molding time and the molding cost of the products concerning the applications described above.

DETAILED DESCRIPTION OF EMBODIMENTS OF THE INVENTION

Figure 1:
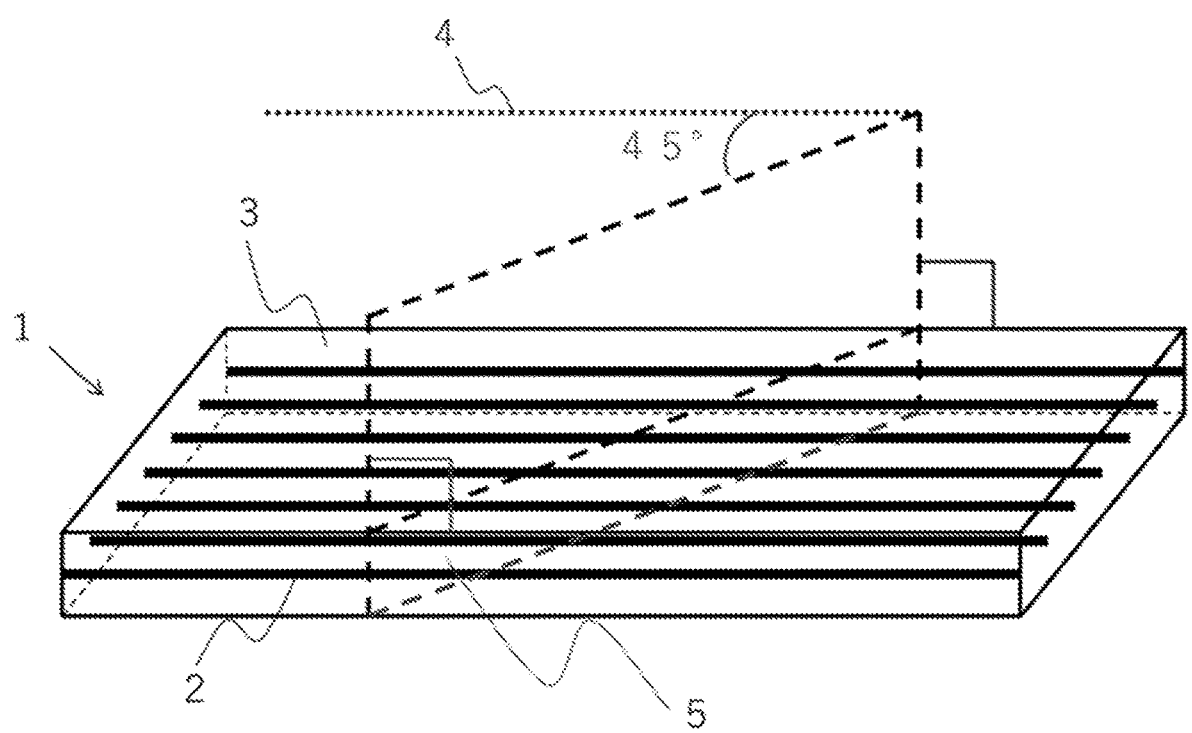
FIG. 1 is a schematic view showing a prepreg or a laminate according to embodiments of the present invention, and showing a cross-section vertical to a prepreg plane or a laminate plane in FIG. 2.

The reinforcing fibers, the structural component [A], used in the present invention, may include glass fibers, carbon fibers, metal fibers, aromatic polyamide fibers, polyaramid fibers, alumina fibers, silicon carbide fibers, boron fibers, basalt fibers, and the like. They may be used alone or in combination of 2 or more, as appropriate. The reinforcing fibers may be subjected to a surface treatment. The surface treatment may include a metal deposition treatment, a treatment using a coupling agent, a treatment using a sizing agent, an additive deposition treatment, and the like. The reinforcing fibers may include reinforcing fibers having conductivity. As the reinforcing fibers, carbon fibers having a small specific gravity, high strength, and high elastic modulus are preferably used.

Commercially available products of the carbon fiber may include "TORAYCA (registered trademark)" T800G-24K", TORAYCA (registered trademark)" T800S-24K, "TORAYCA (registered trademark)" T700G-24K, "TORAYCA (registered trademark)" T700S-24K, "TORAYCA (registered trademark)" T300-3K, and "TORAYCA (registered trademark)" T1100G-24K (they are manufactured by Toray Industries, Inc.), and the like.

The form and arrangement of the reinforcing fibers can be appropriately selected from forms or arrangements in which the reinforcing fibers are arranged in one direction, laminates of products in which the reinforcing fibers are arranged in one direction, and woven fabrics, and the like, and in order to obtain a laminate which is lightweight and has a higher level of durability, it is preferable that the reinforcing fibers are in a form of a continuous fiber, such as long fibers (fiber bundles) of the reinforcing fibers arranged in one direction or a woven fabric, in each prepreg.

The reinforcing fiber bundle may be composed of a plurality of fibers in the same form, or may be composed of a plurality of fibers in the different forms. The number of the reinforcing fibers forming one reinforcing fiber bundle is usually 300 to 60,000, and is preferably 300 to 48,000, more preferably 1,000 to 24,000 in consideration of production of a base material. The range may be a combination of any of the above upper limits and any of the lower limits, described above.

The structural component [A], the reinforcing fibers, having a strand tensile strength, measured in accordance with the resin-impregnated strand test method of JIS R7608 (2007), of 5.5 GPa or more is preferable, because in such a case a laminate having the excellent joining strength in addition to the tensile strength can be obtained. The strand tensile strength is more preferably 5.8 GPa. The joining strength as used herein refers to a tensile shear joining strength determined in accordance with ISO 4587: 1995 (JIS K6850 (1994)), and an out-of-plane tensile joining strength determined in accordance with ASTM D7291 07.

The structural component [B] used in embodiments of the present invention is an epoxy resin, and all epoxy resins included therein has an average epoxy value of 2.0 meq./g or more and 5.0 meq./g or less. Here, as an example, when two components of an epoxy resin 1 and an epoxy resin 2 are included, the average epoxy value of all epoxy resins included is calculated as follows:

Average epoxy value (meq./g)=(parts by mass of
epoxy resin 1/epoxy equivalent of epoxy resin
1+parts by mass of epoxy resin 2/epoxy equivalent of epoxy resin 2)/(parts by mass of epoxy
resin 1+parts by mass of epoxy resin 2)×1000

Here, the epoxy equivalent refers to a value obtained by a method described in JIS K7236 (2009). When the average epoxy value of all epoxy resins included is 2.0 meq./g or more and 5.0 meq./g or less, the laminate or molding exhibits the excellent tensile shear joining strength, out-of-plane tensile joining strength, and impact joining strength. Further, an aspect in which the average epoxy value of the all epoxy resins included is 2.5 meq./g or more and 4.0 meq./g or less is more preferable. The range may be a combination of any of the above upper limits and any of the lower limits, described above.

The composition including the structural component [B] included in the prepreg of the present invention preferably has a bending fractural strain of 8% or more in a state in which a degree of curie is 90% or more, and when such a cured product is included in the laminate of the present invention, the impact joining strength is preferably excellent upon joining the laminate to a member. That is, in the laminate of the present invention, it is preferable that the cured product of the epoxy resin, the structural component [D], has a bending fractural strain of 8% or more.

The bending fractural strain can be determined by a three-point bending test based on JIS K7171 (1994). When the bending fractural strain of the structural component [B] included in the prepreg in a state in which the degree of cure is 90% or more, or the bending fractural strain of the structural component [D] included in the laminate is determined, the kind of epoxy resin is specified, and then a composition including a resin, which is the same kind of the specified resin and is uncured, is formed in the same manner as in the measurement of the degree of cure described below, the resulting composition is cured, and it is subjected to the measurement of the bending fractural strain. The upper limit of the bending fractural strain is not particularly limited, and in the cured products of normal epoxy resins, the upper limit of the bending fractural strain is 100%.

The state in which the degree of cure of the structural component [B] is 90% or more can be achieved by thermally curing the epoxy resin, which is the structural component [B], and the epoxy resin composition before curing, which is specified as the curing agent, in predetermined conditions. The thermal curing in the predetermined conditions refers to conditions in which first heating is performed at 135° C. for 2 hours or at 180° C. for 2 hours, and further heating is added as necessary until the degree of cure reaches 90% or more. The degree of cure of the cured product of the epoxy resin, obtained by heating at 135° C. for 2 hours or 180° C. for 2 hours, is measured, and when the degree of cure is 90% or more, then the cured product of the epoxy resin can be used for the evaluation of characteristics. When the degree of cure is less than 90% at a heating temperature of 135° C. for 2 hours or at a heating temperature of 180° C. for 2 hours, post-heating is performed at 180° C. for 2 hours, and the degree of cure is confirmed. When the degree of cure is less than 90% after the post-heating, heating is performed until the degree of cure reaches 90% or more at 200° C., i.e., is sequentially performed for 1 hour, at 220° C. for 1 hour, and at 240° C. for 1 hour until the degree of cure reaches 90%. When the degree of cure does not reach 90% even after heating at 240° C. for 1 hour, the desired cured product of the epoxy resin is obtained by performing heating at a temperature of 300° C. or lower until the degree of cure reaches 90% or more, and it can be used for the characteristic evaluations.

Here, the degree of cure is a value obtained by calculating a calorific value of each of the epoxy resin which is the structural component [B], the epoxy resin composition before curing which is specified as the curing agent, and the cured product of the epoxy resin as an area of a peak appearing as an exothermic reaction when a differential scanning calorimetry is performed at a temperature-rising rate of 10° C./min in an inert gas atmosphere, and using the following formula. Apart from the structural component [B] included in the prepreg, an epoxy resin and a resin having the same structure as that specified as the curing agent are prepared, and they may be subjected to the measurement. Here, when the curing agent cannot be specified, 4,4'-diaminodiphenyl sulfone may be used as the curing agent in the composition. In addition, compounds described below in Examples such as a curing catalyst and a viscosity modifier can be preferably used as a component capable of forming the composition, and they are not particularly limited as long as they do not affect the measurement result.

Degree of cure (%)=((a calorific value of the composition including the epoxy resin before curing)−(a calorific value of the cured product of the epoxy resin))/(a calorific value of the composition including the epoxy resin before curing)×100

The cured product of the epoxy resin, the structural component [D], in the present invention can be obtained by thermally curing the epoxy resin, the structural component [B]. The curing of the structural component [D] included in the laminate can be determined in a manner in which when the laminate is subjected to a differential scanning calorimetry at a temperature-rising rate of 10° C./min in an inert gas atmosphere, if an area of a peak appearing as an exothermic reaction (residual heat generation) is 50 J/g or less, it can be determined that the laminate is substantially a cured product. Alternatively, when the epoxy resin composition before curing can be specified, the degree of cure is obtained by using the formula described above, and if the value is 90% or more, it may be determined that the resulting product is the cured product. When the prepreg according to embodiments of the present invention is used, the epoxy resin corresponds to the structural component [B]. The laminate of the present invention does not necessarily pass through the prepreg, but may be produced by a resin transfer molding method described below, or the like.

The epoxy resin used for the structural component [B] may include, for example, bisphenol type epoxy resins such as bisphenol A type epoxy resin, bisphenol F type epoxy resin, bisphenol AD type epoxy resin, and bisphenol S type epoxy resins, brominated epoxy resins such as tetrabromobisphenol A diglycidyl ether, epoxy resins having a biphenyl backbone, epoxy resins having a naphthalene backbone, epoxy resins having a dicyclopentadiene backbone, novolac type epoxy resins such as phenol novolac type epoxy resin, and cresol novolac type epoxy resin, glycidyl amine type epoxy resins such as N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline, N,N,N',N'-tetraglycidyl-m-xylylenediamine, N,N-diglycidylaniline, and N,N-diglycidyl-o-toluidine, resorcidyl glycidyl ether, triglycidyl isocyanurate, and the like.

An aspect in which the structural component [B] of the present invention includes a bisphenol type epoxy resin having an epoxy equivalent of 400 or more and 3000 or less in an amount of 20 parts by mass or more and 50 parts by mass or less based on 100 parts by mass of all epoxy resins included is preferable, because the laminate and molding having the excellent impact joining strength are obtained. An aspect is more preferable in which a bisphenol type epoxy resin having an epoxy equivalent of 1000 or more and 3000 or less is included in an amount of 20 parts by mass or more and 50 parts by mass or less based on 100 parts by mass of the all epoxy resins included therein.

The curing agent of the epoxy resin may include, for example, dicyandiamides, aromatic amine compounds, phenol novolac resins, cresol novolac resins, polyphenol compounds, imidazole derivatives, tetramethylguanidine, thiourea-added amines, carboxylic acid hydrazides, carboxylic acid amides, polymercaptans, and the like. Among them, dicyandiamide or an aromatic amine compound is preferable because when it is used, good reactivity, and excellent dynamic characteristics and heat resistance as a cured product can be obtained. The aromatic amine compound may include, for example, 3,3'-diisopropyl-4,4'-diaminodiphenyl sulfone, 3,3'-di-t-butyl-4,4'-diaminodiphenyl sulfone, 3,3'-diethyl-5,5'-dimethyl-4,4'-diaminodiphenyl sulfone, 3,3'-diisopropyl-5,5'-dimethyl-4,4'-diaminodiphenyl sulfone, 3,3'-di-t-butyl-5,5'-dimethyl-4,4'-diaminodiphenyl sulfone, 3,3', 5,5'-tetraethyl-4,4'-diaminodiphenyl sulfone, 3,3'-diisopropyl-5,5'-diethyl-4,4'-diaminodiphenyl sulfone, 3,3'-di-t-butyl-5,5'-diethyl-4,4'-diaminodiphenyl sulfone, 3,3',5,5'-tetraisopropyl-4,4'-diaminodiphenyl sulfone, 3,3'-di-t-butyl-5,5'-diisopropyl-4,4'-diaminodiphenyl sulfone, 3,3',5,5'-tetra-t-butyl-4,4'-diaminodiphenyl sulfone, 4,4'-diaminodiphenyl sulfone, 3,3'-diaminodiphenyl sulfone, and the like.

Furthermore, it is preferable that the epoxy resin, the structural component [B], includes a thermoplastic resin component soluble in the epoxy resin in a dissolved state as a viscosity modifier. Such a thermoplastic resin component is another thermoplastic resin component different from the structural component [C]. Here, the phrase "soluble in the epoxy resin" refers to a state in which when a mixture of a thermoplastic resin component with an epoxy resin is heated or stirred while heating, there is a temperature region in which the mixture is in a uniform phase. Here, "in a uniform phase" refers to a state in which separation is not observed visually. Here, the "dissolved state" refers to a state in which when the temperature of the epoxy resin including the thermoplastic resin component is adjusted to a certain region, a uniform phase is formed. Once the uniform phase is formed in the certain temperature range, there is no problem even if the separation may occur at a temperature other than the temperature range, for example, at room temperature.

The thermoplastic resin component soluble in the epoxy resin, the structural component [B], is generally preferably a thermoplastic resin having, in the main chain, a bond selected from the group consisting of a carbon-carbon bond, an amide bond, an imide bond, an ester bond, an ether bond, a carbonate bond, a urethane bond, a thioether bond, a sulfone bond, and a carbonyl bond. In addition, the thermoplastic resin component may partially have a crosslinked structure, and may be crystalline or may be amorphous. In particular, a resin is preferable which is at least one resin selected from the group consisting of polyamide, polycarbonate, polyacetal, polyphenylene oxide, polyphenylene sulfide, polyarylate, polyester, polyamideimide, polyimide, polyetherimide, polyimide having a phenyltrimethylindane structure, polysulfone, polyethersulfone, polyetherketone, polyetheretherketone, polyaramid, polyvinyl formal, polyvinyl butyral, phenoxy resin, polyethernitrile, and polybenzimidazole.

The thermoplastic resin forming the structural component [C] is not particularly limited, and examples thereof may include polyester-based resins (polyethylene terephthalate, polybutylene terephthalate, polytrimethylene terephthalate, polyethylene naphthalate, liquid crystal polyester, and the like), polyolefin-based resins (polyethylene, polypropylene, polybutylene, and the like), styrene-based resins, urethane resins, polyoxymethylene, polyamide-based resins (aliphatic polyamides such as polyamide 6 and polyamide 66, semi-aromatic polyamides, alicyclic polyamides, and the like), polycarbonate, polymethyl methacrylate, polyvinyl chloride, polyphenylene sulfide, polyphenylene ether, modified polyphenylene ether, polyimide, polyamide imide, polyetherimide, polysulfone, modified polysulfone, polyether sulfone, polyketone, polyarylene ether ketone (polyether ketone, polyether ether ketone, polyether ketone ketone, and the like), polyarylate, polyether nitrile, phenol-based resins, phenoxy resins, and the like. In addition, these thermoplastic resins may be copolymers or modified products of the above-mentioned resins, and/or resins obtained by blending 2 or more kinds thereof.

In order to improve the impact resistance, an elastomer or a rubber component may be added to the epoxy resin or the thermoplastic resin. Furthermore, the epoxy resin or the thermoplastic resin may appropriately include other fillers or additives as long as the object of the present invention is not impaired depending on the use, and the like. Examples thereof may include inorganic fillers, flame retardants, conductivity imparting agents, crystal nucleating agents, ultraviolet absorbers, antioxidants, damping agents, antibacterial agents, insect repellents, deodorants, coloring inhibitors, heat stabilizers, mold release agents, antistatic agents, plasticizers, lubricants, coloring agents, pigments, dyes, foaming agents, antifoaming agents, coupling agents, and the like.

In the prepreg according to embodiments of the present invention, the reinforcing fibers [A] are present included in the resin area including [B] and the resin area including [C] across the interface between the two resin areas.

The presence of [A] included in the two resin areas across the interface between the two resin areas can be confirmed by observing a cross-section obtained by cutting the prepreg vertically to the planar direction. One example is shown with reference to FIG. 2. In the observation image 9 in FIG. 2, in prepreg, the resin area 7 including the structural component [C] closely adheres to the resin area 8 including the structural component [B], and a surface at which the resin area 7 including the structural component [C] closely adheres to the resin area 8 including the structural component [B] is illustrated as an interface 10. In addition, a plurality of the structural components [A] 6 are present on the interface 10. The structural components [A] 6 on the interface 10 are brought into contact with both of the resin area 7 including the structural component [C] and the resin area 8 including the structural component [B]. The state in which the structural component [C] and the structural component [B] are brought into contact with each other around the reinforcing fibers, as described above, can refer to a state in which the reinforcing fibers are "included in the two resin areas across the interface".

Furthermore, when the prepreg of the present invention is viewed in planar view, in a cross-section vertical to a plane of the prepreg including the fibers [A], present across the interface between the two resin areas, from a direction of an angle different by 45 degrees, either clockwise or counterclockwise, to the direction of any fiber included in the two resin areas, i.e., in a cross-section obtained by cutting the prepreg vertically to the prepreg plane direction, or the like, it is preferable that a cross-sectional curve, formed by the interface between the two resins, has an average roughness length RSm, defined in accordance with JIS B0601 (2001), of 100 μm or less, and an average roughness height Rc of 3.5 μm or more.

Figure 2:
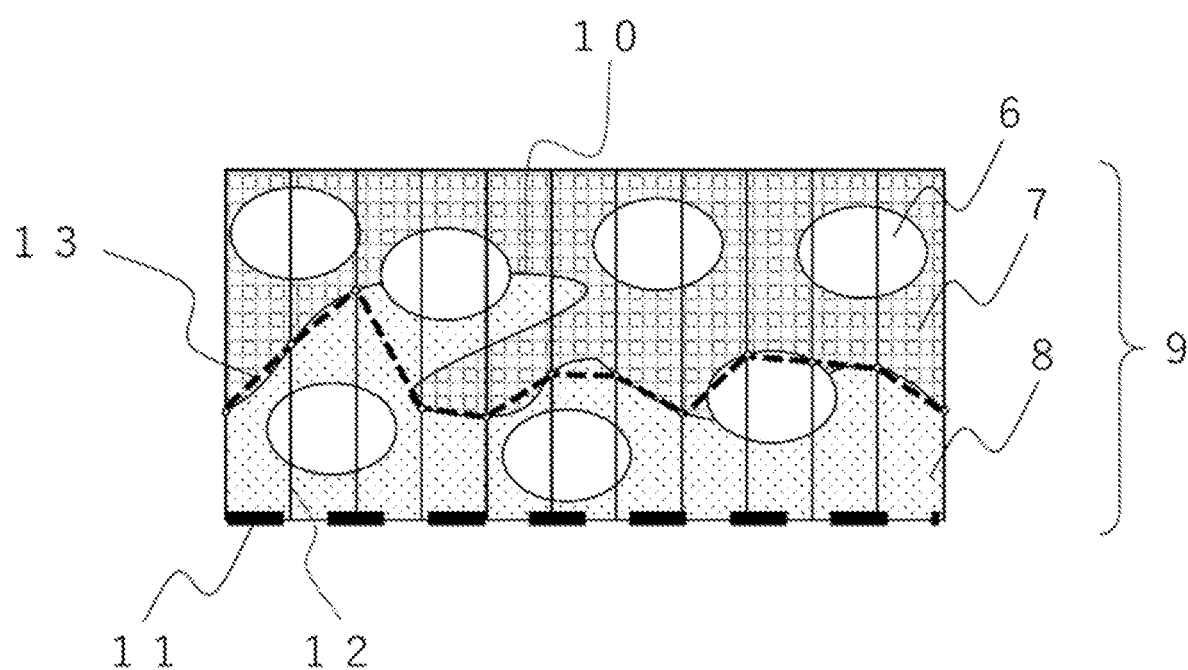
FIG. 2 is a schematic view showing a cross-section vertical to a prepreg plane or a laminate plane in embodiments of the present invention, and helps to explain a method for measuring an average roughness length RSm and an average roughness height Rc.

In addition, it is preferable that the resin area including [B] and the resin area including [C] are adjacent to each other in a layered state to form the interface. The phrase "adjacent to each other in a layered state" refers to a state in which the two continuous resin areas are present adjacent to each other, as shown in FIG. 2 as an example, and it can be confirmed by observing a cross-section obtained by cutting the prepreg vertically to the prepreg plane direction.

The presence of the reinforcing fibers [A] included in the resin area including the structural component [B] and the resin area including the structural component [C] across the interface between the two resin areas improves the strength of the resin area including the structural component [C], and improves the joining strength. The structural component [A] present on the interface is chemically and/or physically bonded to the structural component [B] and to the structural component [C], whereby the adhesive force between the resin area including the structural component [B] and the resin area including the structural component [C] is improved. It is enough that the number of the fibers in the structural component [A] present on the interface is 1 or more, and though the upper limit of the number is not particularly limited, it is 200 in an observation range described below.

When the prepreg is viewed in planar view, i.e., it is viewed vertically to the prepreg plane direction, the interface between the resin area including the structural component [B] and the resin area including the structural component [C] is observed in a cross-section vertical to a prepreg plane including the fibers [A], present across the two resin areas, from a direction of an angle different by 45 degrees, either clockwise or counterclockwise, to the direction of any fiber [A] included in the two resin areas. In the cross-section, when the states of the resin areas are observed at the interface, it is possible to simultaneously evaluate the adhesive force in the fiber direction and in the direction vertical thereto.

In such a cross-sectional observation, it is preferable that the cross-sectional curve, formed by the interface, has an average roughness length RSm, defined in accordance with JIS B0601 (2001), of 100 μm or less, because it is less likely to be peeled off the resin area including the structural component [B] and the resin area including the structural component [C] from each other due to not only a chemical and/or physical bonding force but also a mechanical bonding force of entanglement. The lower limit thereof is not particularly limited, and is preferably 15 μm or more for avoiding decrease in the mechanical bonding force due to stress concentration. It is preferable that the cross-sectional curve has an average roughness height Rc of 3.5 μm or more, because not only the mechanical bonding force is exhibited by the entanglement but also the structural component [A], present on the interface, is chemically and/or physically bonded to the structural component [B] and the structural component [C], thus resulting in the improvement of the adhesive force between the resin area including the structural component [B] and the resin area including the structural component [C]. The average roughness height Rc of the cross-sectional curve is more preferably 10 μm or more, particularly preferably 20 μm or more, in which the structural component [A] is easily included in the two resin areas and thus the adhesive force is further improved. The upper limit is not particularly limited, and is preferably 100 μm or less for avoiding decrease in the mechanical bonding force due to stress concentration.

Here, for measuring the average roughness height Rc and the average roughness length RSm of the cross-sectional curve, known methods can be used. Examples thereof may include a method in which after the structural component [B] is cured, measurement is performed from a cross-sectional image obtained using an X-ray CT, a method in which measurement is performed from an elemental analysis mapping image by using an energy dispersive X-ray spectrometer (EDS), and a method in which measurement is preformed from a cross-sectional observation image by using an optical microscope, a scanning electron microscope (SEM), or a transmission electron microscope (TEM). In the observation, the structural component [B] and/or the structural component [C] may be dyed in order to adjust the contrasts. In the image obtained by any of the above methods, the average roughness height Rc and the average roughness length RSm of the cross-sectional curve are measured in a range of 500 μm square.

One example of the method for measuring the average roughness height Rc or the average roughness length RSm of the cross-sectional curve (a method 1 for measuring a cross-sectional curve element) is shown with reference to FIG. 2. Vertical baselines 12 are drawn at an interval of 5 μm from the resin area 8 including the structural component [B] toward the resin area 7 including the structural component [C], the end 11 on the resin area including the structural component [B] in the rectangular observation image 9 being defined as a baseline. Points at which the vertical baseline drawn from the baseline intersects the structural component [C] for the first time are plotted, and a line connecting the plotted points is defined as a cross-sectional curve 13. The obtained cross-sectional curve 13 is subjected to a filtering processing in accordance with JIS B0601 (2001), and the average roughness height Rc and the average roughness length RSm of the cross-sectional curve 13 are calculated.

It is preferable that the resin area including [B] and the resin area including [C] are adjacent to each other in a layered state to form the interface, because the excellent dynamic characteristics can be exhibited.

In the prepreg of the present invention, it is preferable that the structural component [C], the thermoplastic resin, has a basis weight of 10 g/m$^2$ or more. The basis weight is preferably 10 g/m$^2$ or more, because a sufficient thickness for exhibiting the excellent joining strength can be obtained. The basis weight is more preferably 20 g/m$^2$. The upper limit is not particularly limited, and is preferably 500 g/m$^2$ or less, because the amount of the thermoplastic resin is not excessively large as compared to the amount of the reinforcing fibers, and a laminate having the excellent specific strength and specific elastic modulus can be obtained. Here, the basis weight refers to a mass (g) of the structural component [C] included per 1 m$^2$ of the prepreg.

The prepreg of the present invention preferably has an amount of the reinforcing fibers per unit area of 30 to 2,000 g/m$^2$. When the amount of the reinforcing fibers is 30 g/m$^2$ or more, the number of layers can be reduced for obtaining a predetermined thickness in the molding of the laminate, and the operation tends to be simple. On the other hand, when the amount of the reinforcing fibers is 2,000 g/m$^2$ or less, the drapability of the prepreg is easily improved.

The mass content of the reinforcing fibers in the prepreg of the present invention is preferably 30 to 90% by mass, more preferably 35 to 85% by mass, still more preferably 40 to 80% by mass. The range may be a combination of any of the above upper limits and any of the lower limits, described above. When the mass content of the reinforcing fibers is 30% by mass or more, the amount of the resin is not excessively large relative to the amount of the fibers, and it is easy to obtain the advantage of the laminate having the excellent specific strength and specific elastic modulus, and a calorific value is hardly excessively increased at the time of curing during the molding of the laminate. When the mass content of the reinforcing fibers is 90% by mass or less, poor impregnation of the resin is unlikely to occur, and voids in the resulting laminate are likely to be reduced.

The laminate according to embodiments of the present invention satisfies the following forms. It includes a layer including the structural components [A], [C], and [D], wherein [D] is a cured product of an epoxy resin in which all epoxy resins have an average epoxy value of 2.0 meq./g or more and 5.0 meq./g or less, and the reinforcing fibers [A] are present, which are included in a resin area including [C] and a resin area including [D] across the interface between the two resin areas.

The structural component [D], used in embodiments of the present invention, is the cured product of the epoxy resin, and is the cured product of the epoxy resin having an average epoxy value, of the all epoxy resins, of 2.0 meq./g or more and 5.0 meq./g or less. Here, the epoxy value is calculated as described above.

The presence of [A] included in the two resin areas across the interface between the two resin areas can be confirmed by observing a cross-section obtained by cutting the laminate vertically to the planar direction of the laminate, similarly to the confirmation method in the prepreg described above. One example is shown with reference to FIG. 2. In the observation image 9 in FIG. 2, in the laminate, the resin area 7 including the structural component [C] closely adheres to the resin area 8 including the structural component [D], and a surface at which the resin area 7 including the structural component [C] and the resin area 8 including the structural component [D] closely adhere to each other is illustrated as an interface 10. In addition, a plurality of the structural components [A] 6 are present on the interface 10. The structural component [A] 6 on the interface 10 is brought into contact with both of the resin area 7 including the structural component [C] and the resin area 8 including the structural component [D]. The state in which the structural component [C] and the structural component [D] are brought into contact with each other around the reinforcing fiber, as described above, can refer to a state in which the reinforcing fibers are "included in the two resin areas across the interface".

Furthermore, when the laminate of the present invention is viewed in planar view, in a cross-section vertical to a plane of the laminate including [A], present across the two resin areas, at an angle of 45 degrees in a viewpoint vertical to the plane direction of the laminate, either clockwise or counterclockwise, to the direction of any fiber [A] included in the two resin areas, i.e., in a cross-section to be observed, obtained by cutting the laminate vertically to the laminate plane direction, it is preferable that a cross-sectional curve, formed by the interface between the two resin areas closely adhering to each other, has an average roughness length RSm, defined in accordance with JIS B0601 (2001), of 100 µm or less, and an average roughness height Rc of 3.5 µm or more. The average roughness height Rc is more preferably 10 µm or more. The lower limit of RSm and the upper limit of Rc are not particularly limited, and RSm is preferably 15 µm or more and Rc is preferably 100 µm or less in terms of concern of reduction in the mechanically bonding force due to the stress concentration. As a method for measuring the average roughness height Rc and the average roughness length RSm of the cross-sectional curve, the same method as in the measuring method in the prepreg of the present invention, as described above, can be employed.

It is preferable that the resin area including [C] and the resin area including [D] are adjacent to each other in a layered state to form the interface, because the excellent dynamic characteristics can be exhibited. The phrase adjacent in a layered state refers to a state in which the two continuous resin areas are present adjacent to each other, as illustrated in FIG. 2 as an example, and it can be confirmed by observing a cross-section obtained by cutting the laminate vertically to the laminate planar direction.

An aspect is preferable in which the structural component [D] in the present invention is a cured product of an epoxy resin including a bisphenol type epoxy resin having an epoxy equivalent of 400 or more and 3000 or less in an amount of 20 parts by mass or more and 50 parts by mass or less based on 100 parts by mass of the all epoxy resins included, because the obtained laminate and molding have the excellent impact joining strength. A more preferable aspect is a cured product of the epoxy resin including a bisphenol type epoxy resin having an epoxy equivalent of 1000 or more and 3000 or less in an amount of 20 parts by mass or more and 50 parts by mass or less based on 100 parts by mass of the all epoxy resins included.

The method for molding the laminate of the present invention may include, for example, molding methods such as a press molding method, an autoclave molding method, a bagging molding method, a wrapping tape method, an internal pressure molding method, a hand lay-up method, a filament winding method, a pultrusion method, a resin injection molding method, and a resin transfer molding method.

The laminate of the present invention can be produced by a method in which the prepreg of the present invention described above is laminated alone or together with another prepreg to form a product in which the prepreg of the invention forms at least a part of the layers, and the laminate is cured by pressurization and heating. Here, as the method for applying heat and pressure, for example, a press molding method, an autoclave molding method, a bagging molding method, a wrapping tape method, an internal pressure molding method, or the like, is adopted.

In the laminate according to embodiments of the present invention, there is the structural component [C], the thermoplastic resin, on the surface thereof or between the layers. It is preferable that the structural component [C] is present both on the surface of the laminate and between the layers. When the structural component [C], the thermoplastic resin, is present on the surface of the laminate, the laminate of the present invention can be joined to the same or different kind of member through the structural component [C] by welding; on the other hand, when the structural component [C], the thermoplastic resin, is present between the layers in the laminate, the excellent interlaminar fractural toughness values ($G_{IC}$ and $G_{IIC}$) can be obtained.

The laminate of the present invention can be integrated (welded) with another member, i.e., a member (adherend), which is the same and/or different kind of member forming the laminate, through the structural component [C] present on the surface of the laminate, by joining the member to the structural component [C] by some kind of heating means. The different kind of member (adherend) may include members including a thermoplastic resin and members including a metal material. The member including the thermoplastic resin may include reinforcing fibers or filler, and the like. The integration method is not particularly limited, and may include, for example, thermal welding, vibration welding, ultrasonic welding, laser welding, resistance welding, induction welding, insert injection molding, outsert injection molding, and the like.

As for the strength of the joint portion of the integrated member, the tensile shear joining strength, measured based on ISO 4587: 1995 (JIS K6850 (1994)), is preferably 25 MPa or more, more preferably 28 MPa or more. In addition, the out-of-plane tensile joining strength, measured based on ASTM D7291-07, is preferably 35 MPa or more, more preferably 40 MPa or more. Further, the impact joining strength, measured based on JIS K6855 (1994), is preferably 6 kJ/m² or more, more preferably 9 kJ/m² or more. The better the laminate, the higher the joining strength, and though the upper limit thereof is not particularly limited, in the integrated moldings of the normal laminates, the upper limit is 200 MPa for the tensile shear joining strength, 300 MPa for the out-of-plane tensile joining strength, and 50 kJ/m² for the impact joining strength.

EXAMPLES

Hereinafter, the present invention will be described in more detail with reference to Examples. However, the scope of the present invention is not limited to these Examples. The unit "part" of the composition ratio means part by mass unless otherwise noted. In addition, measurements of various characteristics were performed under an environment in which a temperature was 23° C. and a relative humidity was 50% unless otherwise noted.

Materials Used in Examples and Comparative Examples

The following structural components [A], [B], [C], and [D] were used. The structural components used in each of Examples and Comparative Examples are as shown in Tables 1 to 3.

Structural Component [A]: Reinforcing Fibers

T800: Carbon fiber ("TORAYCA (registered trademark)" T800S-24 K, manufactured by Toray Industries, Inc., strand tensile strength: 5.9 GPa)

T1100: Carbon fiber ("TORAYCA (registered trademark)" T1100G-24 K, manufactured by Toray Industries, Inc., strand tensile strength: 7.0 GPa)

T700: Carbon fiber ("TORAYCA (registered trademark)" T700S-24 K, manufactured by Toray Industries, Inc., strand tensile strength: 4.9 GPa).

Structural Component [C]: Thermoplastic Resin

PA6: Film including polyamide 6 ("Amilan" (registered trademark) CM 1007 (manufactured by Toray Industries, Inc., melting point: 225° C.)) and having a basis weight of 120 g/m²

PP: Film including polypropylene ("UMEX" (registered trademark) 1010 (manufactured by Sanyo Chemical Industries, Ltd., melting point: 142° C.)) and having a basis weight of 120 g/m²).

PEs: Film including polyester ("Hytrel" (registered trademark) 2551 (manufactured by DU PONT-TORAY CO., LTD., melting point: 164° C.)) and having a basis weight of 120 g/m²).

PPS: Film including polyphenylene sulfide ("Torelina" (registered trademark) A670T05 (manufactured by Toray Industries, Inc., melting point: 278° C.) and having a basis weight of 120 g/m²

PEEK: Film including polyether ether ketone (PEEK 450G (manufactured by Victrex, melting point: 343° C.) and having a basis weight of 120 g/m².

<Production Method and Evaluation Method of Epoxy Resin Composition>

An epoxy resin composition of each specific example described in Table 1 was prepared using the following compounds.

(1) Epoxy Resin

Bisphenol A type epoxy resin ("jER" (registered trademark) 825, manufactured by Mitsubishi Chemical Corporation), epoxy equivalent: 175 (g/eq.))

Phenol novolak type epoxy resin ("jER" (registered trademark) 154, manufactured by Mitsubishi Chemical Corporation), epoxy equivalent: 178 (g/eq.))

Bisphenol A type epoxy resin ("jER" (registered trademark) 1001, manufactured by Mitsubishi Chemical Corporation), epoxy equivalent: 475 (g/eq.))

Bisphenol A type epoxy resin ("jER" (registered trademark) 1004, manufactured by Mitsubishi Chemical Corporation), epoxy equivalent: 925 (g/eq.))

Bisphenol A type epoxy resin ("jER" (registered trademark) 1007, manufactured by Mitsubishi Chemical Corporation), epoxy equivalent: 1975 (g/eq.)).

(2) Curing Agent 4,4'-Diaminodiphenyl sulfone (SEIKACURE S, manufactured by Wakayama Seika Kogyo Co., Ltd.)

Dicyandiamide (DICY7, manufactured by Mitsubishi Chemical Corporation).

(3) Curing Catalyst 3-(3,4-dichlorophenyl)-1,1-dimethylurea (DCMU99, manufactured by Hodogaya Chemical Co., Ltd.).

(4) Viscosity Modifier

Polyvinyl formal ("VINYREC" (registered trademark) K, manufactured by JNC Corporation).

(5) Method for Preparing Epoxy Resin Composition

The epoxy resin and the viscosity modifier described in Table 1 were charged into a kneading apparatus, and the mixture was heated and kneaded to dissolve the viscosity modifier (however, there was a case in which no viscosity modifier was added). Subsequently, the temperature was lowered to 100° C. or lower while continuing the kneading, and then compounds appropriately selected from the curing agent and the curing catalysts shown in Table 1 were added thereto, and the resulting mixture was stirred to obtain epoxy resin compositions B-1 to B-10.

<Production Method and Evaluation Method of Cured Product of Epoxy Resin>

The epoxy resin composition, prepared as above, was injected into a mold, the temperature was raised from 30° C. to a curing temperature described in Table 1 at a rate of 1.5° C./min in a hot air dryer, the composition was heated and cured at a curing time described in Table 1, and then the temperature was lowered to 30° C. at a rate of 2.5° C./min to produce a plate-shaped cured product of the epoxy resin having a thickness of 2 mm. It is the cured product of the epoxy resin, the structural component [B], and is the cured product of the epoxy resin, the structural component [D]. The obtained cured product of the epoxy resin was subjected to the evaluations by the following methods in each specific example shown in Table 1.

<Method for Measuring Bending Fractural Strain and Bending Strength of Cured Product of Epoxy Resin>

A rectangular test piece having a length of 60 mm and a width of 10 mm was cut out from the plate-shaped cured product of the resin, produced by the above method, the test piece was dried in a vacuum oven at 60° C. for 24 hours, a three-point bending test was performed at a test speed of 2.5 ram/min and an inter-fulcrum distance of 32 mm using a universal material testing machine ("Instron" (registered trademark) model 5565 P8564 manufactured by Instron Japan Co., Ltd.), and the bending fractural strain and the bending strength were determined in accordance with JIS K7171 (1994).

<Method for Measuring Melting Point of Thermoplastic Resin>

The melting point of the thermoplastic resin was measured using a differential scanning calorimeter (DSC) in accordance with JIS K7121 (2012). When a plurality of melting points were observed in a mixture or the like, the highest melting point was adopted as the melting point of the thermoplastic resin.

<Method for Producing Prepreg>

The prepreg was prepared by the following 2 methods. The structural components used in each Example were as described in Tables 2 and 3.

Prepreg [I]

While the structural component [A], the reinforcing fibers (basis weight: 193 g/m$^2$), was drawn out as a reinforcing fiber sheet in a continuous state in which the fibers were aligned in one direction and the sheet was run in one direction, a resin sheet including the structural component [C] and having a basis weight of 120 g/m$^2$ was put on the continuous reinforcing fiber sheet, and the structural component [C] was melted by heating it with an IR heater to attach it to the entire one surface of the continuous reinforcing fiber sheet, and pressure was applied to the resulting sheet with nip rolls having a surface temperature maintained to be equal to or lower than the melting point of the structural component [C] to cool the reinforcing fiber sheet impregnated, whereby a fiber-reinforced resin intermediate. The epoxy resin composition, the structural component [B], selected as described in Tables 2 and 3, was coated on a release paper in a resin basis weight of 100 g/m$^2$ using a knife coater to produce an epoxy resin film, and then the epoxy resin film was overlaid on a surface opposite to the surface impregnated with the structural component [C] in the intermediate, and the resulting film was heated and pressurized by using heat rolls to impregnate the intermediate with the epoxy resin composition, whereby a prepreg [I] was obtained.

Prepreg [II]

The epoxy resin composition, the structural component [B], selected as described in Tables 2 and 3 was coated on release paper in a resin basis weight of 50 g/m$^2$ using a knife coater to produce a resin film. This resin film was overlaid on both sides of the reinforcing fibers (basis weight: 193 g/m$^2$), the structural component [A], aligned in one direction, and the resulting film was heated and pressurized by using heat rolls to impregnate the carbon fiber with the epoxy resin composition, whereby a prepreg [II] was obtained.

<Method for Producing Laminate and Evaluation of Dynamic Characteristics>

(1) Method for Measuring Tensile Shear Joining Strength

The prepregs [I] and [II], produced above, were cut into predetermined sizes to obtain 2 prepregs [I] and 6 prepregs [II]. The prepregs were laminated at $[0°/90°]_{2s}$ wherein an axial direction of the reinforcing fiber was defined as 0°, a direction orthogonal to the axial direction was defined as 90°, and the symbol s indicates mirror symmetry, to produce a preform. At that time, the lamination was performed so that the 2 outermost layers of the preform were the prepregs [I]. That is, the lamination was performed so that the 6 prepregs [II] were put between the 2 prepregs [I]. Both surface layers of the preform were the thermoplastic resin layers including the structural component [C]. That is, the prepreg [I] was disposed so that the surface impregnated with the structural component [C] in the prepreg [I] was on the outer side. This preform was set in a press molding die, a pressure of 0.6 MPa was applied with a press machine while maintaining this shape using a jig or a spacer as necessary, and the preform was heated under the conditions described in Tables 2 and 3 to obtain a laminate. The existence position of the structural component [C] was on the surface of the laminate.

The obtained laminate was cut into 2 sheets having sizes of a width of 250 mm and a length of 92.5 mm, in which the 0° direction is the length direction of the test piece, and dried in a vacuum oven for 24 hours. Thereafter, the two cut panels having sizes of a width of 250 mm and a length of 92.5 mm were overlaid on each other, with a width of 25 mm×a length of 12.5 mm with in which the 0° direction was the length direction, a pressure of 3 MPa was applied thereto at a temperature 20° C. higher than the melting point of the thermoplastic resin, the structural component [C] used, and it was held for 1 minute to weld the overlaid surfaces, whereby an integrated molding was obtained. A tab was bonded to the obtained integrated molding in accordance with ISO 4587: 1995 (JIS K6850 (1994)), and it was cut into a width of 25 mm to obtain a desired test piece.

The obtained test piece was dried in a vacuum oven for 24 hours, the tensile shear joining strength was measured at an environmental temperature of 23° C. based on ISO 4587: 1995 (JIS K6850 (1994)), and evaluation was performed as described below based on the measurement results. The results are shown in Table.

28 MPa or more: A
25 MPa or more and less than 28 MPa: B
20 MPa or more and less than 25 MPa: C
Less than 20 MPa: D (failed).

(2) Method for Measuring Impact Joining Strength

The prepregs [I] and [II], as prepared above, were cut into predetermined sizes, and a preform was produced by laminating 52, in total, prepregs [I] and [II], so that the two outermost layers of the both surfaces of the preform were the prepregs [I], and the 50 prepregs [II] were put between the two outermost layers, in the same reinforcing fiber direction. At that time, both surface layers of the preform were the thermoplastic resin layers including the structural component [C]. That is, the prepreg [I] was disposed so that the surface impregnated with the structural component [C] in the prepreg [I] was on the outer side. Similarly, a preform was produced by laminating 105, in total, prepregs so that the two outermost layers of both surfaces of the preform were the prepregs [I], and the 103 prepregs [II] were put between the two outermost layers, in the same reinforcing fiber direction, wherein the both surface layers were thermoplastic resin layers including the structural component [C]. That is, the prepreg [I] was disposed so that the surface impregnated with the structural component [C] in the prepreg [I] was on the outer side. Each of the two kinds of preform was set in a press molding die, a pressure of 0.6 MPa was applied with a press machine while maintaining this shape using a jig or a spacer as necessary, and the preform was heated under the molding conditions described in Table 2 or 3 to obtain two kinds of laminate having a thickness of about 10 mm or a thickness of about 20 mm. The existence position of the structural component [C] was on the surface of the laminate.

The obtained laminate having a thickness of about 10 mm was cut into a quadrangular shape having a width of 250 mm and a length of 25 mm in which the axial direction of the reinforcing fiber was a length direction of the test piece. Further, the obtained laminate having a thickness of about 20 mm was cut into a quadrangular shape having a width of 250 mm and a length of 45 mm in which the axial direction of the reinforcing fiber was a length direction of the test piece, and the obtained two panels were dried in a vacuum oven for 24 hours. Thereafter, the two panels were overlaid on each other in the same axial direction of the reinforcing fiber, and a pressure of 3 MPa was applied thereto at a temperature 20° C. higher than the melting point of the thermoplastic resin, the structural component [C] used, and it was held for 1 minute to weld the joint surfaces, whereby an integrated molding was obtained. The obtained integrated molding was cut into a width of 25 mm to obtain a desired test piece.

The obtained test piece was dried in a vacuum oven for 24 hours, and the impact joining strength of a surface vertical to the axial direction of the reinforcing fiber, which was defined as a surface to which the impact was applied, was measured based on JIS K6855 (1994), and the evaluation was performed based on the measurement results as follows: The results are shown in Table.

9 kJ/m$^2$ or more: A
6 kJ/m$^2$ or more and less than 9 kJ/m$^2$: B
3 kJ/m$^2$ or more and less than 6 kJ/m$^2$: C
Less than 3 kJ/m$^2$: D (failed).

(3) Method for Measuring Out-Of-Plane Tensile Joining Strength

The prepregs [I] and [II], as produced above, were cut into predetermined sizes, a preform was produced by laminating 75, in total, of prepregs [I] and [II] so that the two outermost layers on both surfaces of the preform were the prepregs [I], and 73 prepregs [II] were put between the two outermost layers, in the same reinforcing fiber direction to produce a preform. At that time, the lamination was performed so that the two outermost layers on both sides were the prepreg [I], and both surface layers of the preform were the thermoplastic resin layers including the structural component [C]. This preform was set in a press molding die, a pressure of 0.6 MPa was applied with a press machine while maintaining this shape using a jig or a spacer as necessary, and heating it under the molding conditions described in Table 2 or 3 to obtain a laminate. The existence position of the structural component [C] was on the surface of the laminate.

The obtained reinforcing fiber composite material plate was cut into two quadrangular shapes having a width of 250 mm and a length of 125 mm in which the reinforcing fiber axis is the length direction of the test piece, and dried in a vacuum oven for 24 hours. Thereafter, the two panels were overlaid on each other in the same reinforcing fiber axial direction, a pressure of 3 MPa was applied at a temperature 20° C. higher than the melting point of the thermoplastic resin, the structural component [C] used, and it was held for 1 minute to weld the joint surfaces, whereby an integrated molding was obtained. The obtained integrated molding was ground into a spool shape having an outer diameter of 25 mm, an inner diameter of 19 mm, and a gauge length of 6.4 mm to obtain a desired test piece.

The obtained test piece was dried in a vacuum oven for 24 hours, the antiplane tensile joining strength was measured based on ASTM D7291 07, and the evaluation was performed based on the measurement results as follows: The results are shown in Table.

40 MPa or more: A
35 MPa or more and less than 40 MPa: B
30 MPa or more and less than 35 MPa: C
Less than 30 MPa: D (failed).

(4) Method for Measuring Interlaminar Fractural Toughness Value ($G_{IC}$ and $G_{IIC}$)

The prepreg [I] produced above was cut into a predetermined size, and a total of 20 prepregs were laminated with the surface on which the structural component [C] present facing upward so as to have the same reinforcing fiber direction. At that time, a release film for introducing a preliminary crack was put between the 10th sheet and the 11th sheet, which were placed at the center, to prepare a preform. This preform was set in a press molding die, and a pressure of 0.6 MPa was applied with a press machine while maintaining this shape using a jig or a spacer as necessary under the molding conditions described in Table 2 or 3 to obtain a laminate. The existence position of the structural component [C] was between the layers of the laminate and on the one side of the surfaces.

The obtained laminate was cut into a rectangular test piece having a length of 150 mm and a width of 20 mm, in which the reinforcing fiber axis was the length direction of the test piece, and dried in a vacuum oven at 60° C. for 24 hours. The obtained test piece was evaluated for interlaminar fractural toughness values ($G_{IC}$ and $G_{IIC}$) in an environment at 23° C. in accordance with JIS K7086 (1993).

<Measurement of Average Roughness Length RSm and Average Roughness Height Rc of Prepreg or Laminate>

The prepreg [I] or the laminate, as produced above, was used. As shown in FIG. 1, in the prepreg, an image of a cross-section 5 to be observed, cut vertically to the prepreg plane direction, was photographed at a magnification of 1000 using an optical microscope, in a planar view of the prepreg to the fiber direction 4 of any [A] included in the two resin areas, i.e., at an angle of 45 degrees in a viewpoint vertical to the prepreg plane direction. In an arbitrary observation range of 500 μm square in the obtained image, the average roughness length RSm and the average roughness height Rc, defined in JIS B0601 (2001) of the cross-sectional curve element obtained by the measurement method 1 of the cross-sectional curve element, were measured. The same applies to the laminate.

Examples 1 to 14

In Examples 1 to 14, laminates were produced by the methods described in (1) Method for Measuring Tensile Shear Joining Strength, (2) Method for Measuring Impact Joining Strength, and (3) Method for Measuring Out-of-plane Tensile Joining Strength.

Example 1 and Comparative Examples 1 and 2

In Example 1, as shown in Table 2, in which the epoxy resin having an average epoxy value of 3.9 meq./g was used as the structural component [B], it was shown that the impact joining strength and the out-of-plane tensile joining strength were excellent as the integrated molding, as compared with those in Comparative Example 1 and Comparative Example 2 shown in Table 3.

Examples 1 to 6

As shown in Table 1, in Examples 1 to 6, the epoxy resins having different average epoxy values were used. As shown in Table 2, when the average epoxy value became high, the impact joining strength tended to slightly decrease, and when the average epoxy value became low, the out-of-plane tensile joining strength tended to slightly decrease, but in the range of the average epoxy values in Example 1 to 6, the joining strengths were all excellent.

Example 1 and Example 7

As shown in Table 1, in Example 7, the curing agent different from that in Example 1 was used, but, as shown in Table 2, the excellent joining strengths were shown as in Example 1.

Example 1 and Example 8

As shown in Table 1, in Example 8, the same production method as in Example 1 was performed except that no viscosity modifier was used. As described in Table 2, the excellent joining strengths were exhibited in Example 8 as in Example 1.

Example 1 and Examples 9 and 10

As described in Table 2, in Example 9 and Example 10 in which the reinforcing fibers having different strand tensile strengths were used, the preferable characteristics were exhibited, that is, the tensile shear joining strength and the out-of-plane tensile joining strength are more improved as the higher the strand tensile strength became higher as compared with Example 1.

Example 1 and Examples 11 to 14

As shown in Table 2, in Example 11 to 14, the structural component [C] different from that in Example 1 was used, but the excellent joint strengths were exhibited as in Example 1.

Example 1 and Comparative Example 3

In Comparative Example 3, a prepreg was obtained by pasting films of polyamide 6 ("AMILAN" (registered trademark) CM 1007 (manufactured by Toray Industries, Inc.)) having a film basis weight of 50 g/m² to both surfaces of the reinforcing fiber sheet in which the fibers were arranged in a unidirectional flat shape, and heating and pressurizing it at 250° C. to obtain a prepreg having a basis weight of the reinforcing carbon fiber of 193 g/m². The obtained prepreg was cut into a predetermined size, and lamination was performed at a constitution of $[0°/90°]_{2s}$ for the evaluation of the tensile shear joining strength. For the evaluation of the impact joining strength, two kinds of prepreg, a prepreg of 52, in total, layers and a prepreg of 105, in total, layers, laminated in the same reinforcing fiber direction, were used. For the evaluation of the out-of-plane tensile joining strength, 75 layers were laminated in the same reinforcing fiber direction. A pressure of 3 MPa was applied to each of the resulting prepregs in a press machine and it was heated at 250° C. for 10 minutes to obtain a laminate plate. The tensile shear joining strength, the impact joining strength, and the out-of-plane tensile joining strength of the obtained laminate were measured by the method described in Examples. As shown in Table 3, the laminate plate of Comparative Example 3 showed the out-of-plane tensile strength lower than that in Example 1, and exhibited the insufficient characteristics as the structural material, because it included no epoxy resin.

Example 15 and Comparative Examples 4 and 5

In Example 15, a laminate was produced by the method described in (4) Method for Measuring Interlaminar Fractural Toughness Values ($G_{IC}$ and $G_{IIC}$). The prepreg [I] was cut into a predetermined size, and 20, in total, prepregs were laminated on the surface on which the structural component [C] present facing upward so as to have the same reinforcing fiber direction, and a release film for introducing a preliminary crack was put between the 10th sheet and the 11th sheet, which were placed at the center, to produce a preform. In Comparative Example 4, a prepreg [II] (including no structural component [C]) was cut into a predetermined size, and the lamination and the insertion of the release film were performed in the same manner as in Example 15 to obtain a preform. In Comparative Example 5, polyamide particles (SP-500, manufactured by Toray Industries, Inc.) were uniformly dispersed on one surface of a prepreg [II] (including no structural component [C]), cut into a predetermined size, in an amount of the particles per unit area of the prepreg was 7 g/m², and then the lamination and the insertion of the release film were performed in the same manner as in Example 15 to obtain a preform. In Example 15 and Comparative Examples 4 and 5, a pressure of 0.6 MPa was applied to the obtained preform in a pressing machine and was heated at 135° C. for 120 minutes to obtain a laminate, and then the interlaminar fractural toughness vales ($G_{IC}$ and $G_{IIC}$) were evaluated by the method described in Examples above. As shown in Tables 2 and 3, in Example 15 in which the structural component [C] was included between layers of the laminate, the excellent interlaminar fractural toughness values were shown as compared with Comparative Example 4 in which no structural component [C] was included and Comparative Example 5 in which the thermoplastic resin was included as a different form.

TABLE 1

| | | | B-1 | B-2 | B-3 | B-4 | B-5 | B-6 | B-7 | B-8 | B-9 | B-10 |
|---|---|---|---|---|---|---|---|---|---|---|---|---|
| Epoxy resin composition | Epoxy resin | Bisphenol A type epoxy ("jER (registered trademark)" 825) | 30 | 50 | 30 | 50 | 40 | 30 | 30 | 30 | 50 | 20 |
| | | Phenol novolac type epoxy ("jER (registered trademark)" 154") | 35 | 35 | 35 | | | | 35 | 35 | 50 | |
| | | Bisphenol A type epoxy ("jER (registered trademark)" 1001) | | | 35 | | | | | | | 20 |
| | | Bisphenol A type epoxy ("jER (registered trademark)" 1004) | | | | | | | | | | |
| | | Bisphenol A type epoxy ("jER (registered trademark)" 1007) | 35 | 15 | | 50 | 60 | 70 | 35 | 35 | | 60 |
| | Curing agent | Dicyandiamide (DICY7) | 4.4 | 5.8 | 5.3 | 3.4 | 2.7 | 2.1 | | 4.4 | 6.8 | 1.9 |
| | | 4,4'-diaminodiphenyl sulfone (SEIKACURE S) | | | | | | | 22.8 | | | |
| | Curing catalyst | 3-(3,4-dichlorophenyl)-1,1-dimethylurea (DCMU99) | 3 | 3 | 3 | 3 | 3 | 3 | | 3 | 3 | 3 |
| | Viscosity modifier | Polyvinyl formal | 3 | 3 | 3 | 3 | 3 | 3 | 3 | | 3 | 3 |
| | Average epoxy value (meq./g) | | 3.9 | 4.9 | 4.4 | 3.1 | 2.6 | 2.1 | 3.9 | 3.9 | 5.7 | 1.9 |

TABLE 1-continued

|  |  | B-1 | B-2 | B-3 | B-4 | B-5 | B-6 | B-7 | B-8 | B-9 | B-10 |
|---|---|---|---|---|---|---|---|---|---|---|---|
| Curing conditions | Curing temperature (° C.) | 135 | 135 | 135 | 135 | 135 | 135 | 180 | 135 | 135 | 135 |
|  | Curing time (hours) | 2 | 2 | 2 | 2 | 2 | 2 | 2 | 2 | 2 | 2 |
| Characteristics of cured product of epoxy resin | Bending fractural strain | 12.9 | 8.2 | 9.5 | 11.6 | 10.8 | 9.8 | 10.6 | 12.6 | 6.9 | 10.5 |
|  | Bending strength | 163 | 145 | 152 | 139 | 128 | 120 | 169 | 161 | 138 | 108 |

TABLE 2

|  |  | Example 1 | Example 2 | Example 3 | Example 4 | Example 5 | Example 6 | Example 7 | Example 8 |
|---|---|---|---|---|---|---|---|---|---|
| Structural Component [A]: Reinforcing fibers |  | T800 | T800 | T800 | T800 | T800 | T800 | T800 | T800 |
| Epoxy resin composition (including structural component [B]) |  | B-1 | B-2 | B-3 | B-4 | B-5 | B-6 | B-7 | B-8 |
| Structural Component [C]: Thermoplastic Resin |  | PA6 | PA6 | PA6 | PA6 | PA6 | PA6 | PA6 | PA6 |
| Characteristics of reinforcing fiber | Tensile strength (GPa) | 5.9 | 5.9 | 5.9 | 5.9 | 5.9 | 5.9 | 5.9 | 5.9 |
| Characteristics of epoxy resin | Average epoxy value (meq./g) | 3.9 | 4.9 | 4.4 | 3.1 | 2.6 | 2.1 | 3.9 | 3.9 |
| Characteristics of cured product of epoxy resin (Structural component [D]) | Bending fractural strain (%) | 12.9 | 8.2 | 9.5 | 11.6 | 10.8 | 9.8 | 10.6 | 12.6 |
|  | Bending strength (MPa) | 163 | 145 | 152 | 139 | 128 | 120 | 169 | 161 |
| Reinforcing fibers [A] included in two resin areas across interface |  | Presence | Presence | Presence | Presence | Presence | Presence | Presence | Presence |
| State and arrangement of resin area including [B] or [D] and the resin area including [C] |  | Layered/ Adjacent | Layered/ Adjacent | Layered/ Adjacent | Layered/ Adjacent | Layered/ Adjacent | Layered/ Adjacent | Layered/ Adjacent | Layered/ Adjacent |
| Average roughness length RSm (μm) of prepreg or laminate |  | 45 | 48 | 43 | 44 | 45 | 46 | 46 | 45 |
| Average roughness height Rc (μm) of prepreg or laminate |  | 21 | 22 | 20 | 22 | 22 | 21 | 20 | 22 |
| Molding conditions of preform | Curing temperature (° C.) | 135 | 135 | 135 | 135 | 135 | 135 | 180 | 135 |
|  | Curing time (hours) | 2 | 2 | 2 | 2 | 2 | 2 | 2 | 2 |
| Characteristics of Laminate | Tensile shear joining strength (MPa) | A 29.8 | A 28.8 | A 29.3 | A 30.2 | A 29.7 | A 29.5 | A 29.2 | A 29.5 |
|  | Impact joining strength (KJ/m$^2$) | A 10.6 | B 8.2 | B 8.6 | A 10.4 | A 9.5 | B 8.8 | A 9.8 | A 10.2 |
|  | Out-of-plane tensile joining strength (MPa) | A 42.4 | A 40.8 | A 41.3 | A 40.6 | B 37.8 | B 36.0 | A 42.6 | A 42.1 |
|  | Position of structural component [C] | Surface | Surface | Surface | Surface | Surface | Surface | Surface | Surface |
|  | Interlaminar fractural toughness $G_{IC}$ (KJ/m$^2$) | — | — | — | — | — | — | — | — |
|  | Interlaminar fractural toughness $G_{IIC}$ (KJ/m$^2$) | — | — | — | — | — | — | — | — |

|  |  | Example 9 | Example 10 | Example 11 | Example 12 | Example 13 | Example 14 | Example 15 |
|---|---|---|---|---|---|---|---|---|
| Structural Component [A]: Reinforcing fibers |  | T1100G | T700 | T800 | T800 | T800 | T800 | T800 |
| Epoxy resin composition (including structural component [B]) |  | B-1 | B-1 | B-1 | B-1 | B-1 | B-1 | B-1 |
| Structural Component [C]: Thermoplastic Resin |  | PA6 | PA6 | PP | PEs | PPS | PEEK | PA6 |
| Characteristics of reinforcing fiber | Tensile strength (GPa) | 7.0 | 4.9 | 5.9 | 5.9 | 5.9 | 5.9 | 5.9 |
| Characteristics of epoxy resin | Average epoxy value (meq./g) | 3.9 | 3.9 | 3.9 | 3.9 | 3.9 | 3.9 | 3.9 |
| Characteristics of cured product of epoxy resin (Structural component [D]) | Bending fractural strain (%) | 12.9 | 12.9 | 12.9 | 12.9 | 12.9 | 12.9 | 12.9 |
|  | Bending strength (MPa) | 163 | 163 | 163 | 163 | 163 | 163 | 163 |
| Reinforcing fibers [A] included in two resin areas across interface |  | Presence | Presence | Presence | Presence | Presence | Presence | Presence |
| State and arrangement of resin area including [B] or [D] and the resin area including [C] |  | Layered/ Adjacent | Layered/ Adjacent | Layered/ Adjacent | Layered/ Adjacent | Layered/ Adjacent | Layered/ Adjacent | Layered/ Adjacent |
| Average roughness length RSm (μm) of prepreg or laminate |  | 58 | 41 | 42 | 42 | 46 | 47 | 44 |
| Average roughness height Rc (μm) of prepreg or laminate |  | 19 | 25 | 22 | 24 | 20 | 20 | 21 |
| Molding conditions of preform | Curing temperature (° C.) | 135 | 135 | 135 | 135 | 135 | 135 | 135 |
|  | Curing time (hours) | 2 | 2 | 2 | 2 | 2 | 2 | 2 |
| Characteristics of Laminate | Tensile shear joining strength (MPa) | A 32.2 | B 25.1 | B 25.3 | A 29.2 | A 28.2 | A 30.1 |  |

TABLE 2-continued

|  |  |  |  |  |  |  |  |
|---|---|---|---|---|---|---|---|
| Impact joining strength (KJ/m$^2$) | A 10.9 | B 8.7 | B 8.5 | A 10.4 | A 9.1 | A 11.1 |  |
| Out-of-plane tensile joining strength (MPa) | A 43.4 | B 39.3 | B 38.8 | A 41.3 | A 40.8 | A 43.5 |  |
| Position of structural component [C] | Surface | Surface | Surface | Surface | Surface | Surface | Surface + Interlaminar |
| Interlaminar fractural toughness $G_{IC}$ (KJ/m$^2$) | — | — | — | — | — | — | 2.5 |
| Interlaminar fractural toughness $G_{IIC}$ (KJ/m$^2$) | — | — | — | — | — | — | 4.4 |

TABLE 3

|  |  | Comparative Example 1 | Comparative Example 2 | Comparative Example 3 | Comparative Example 4 | Comparative Example 5 |
|---|---|---|---|---|---|---|
| Structural Component [A]: Reinforcing fibers | | T800 | T800 | T800 | T800 | T800 |
| Epoxy resin composition (including structural component [B]) | | B-9 | B-10 | — | B-1 | B-1 |
| Structural Component [C]: Thermoplastic Resin | | PA6 | PA6 | PA6 | — | PA6 particles |
| Characteristics of reinforcing fiber | Tensile strength (GPa) | 5.9 | 5.9 | 5.9 | 5.9 | 5.9 |
| Characteristics of epoxy resin | Average epoxy value (meq./g) | 5.7 | 1.9 | — | 3.9 | 3.9 |
| Characteristics of cured product of epoxy resin (Structural component [D]) | Bending fractural strain (%) | 6.9 | 10.5 | — | 12.9 | 12.9 |
|  | Bending strength (MPa) | 138 | 108 | — | 163 | 163 |
| Reinforcing fibers [A] included in two resin areas across interface | | Presence | Presence | No | No | No |
| State and arrangement of resin area including [B] or [D] and the resin area including [C] | | Layered/ Adjacent | Layered/ Adjacent | [B] No | [C] No | Not layered |
| Average roughness length RSm (μm) of prepreg or laminate | | 46 | 45 | — | — | — |
| Average roughness height Rc (μm) of prepreg or laminate | | 23 | 23 | — | — | — |
| Molding conditions of preform | Curing temperature (° C.) | 135 | 135 | — | 135 | 135 |
|  | Curing time (hours) | 2 | 2 | — | 2 | 2 |
| Characteristics of Laminate | Tensile shear joining strength (MPa) | A 28.5 | A 28.8 | A 28.7 | | |
|  | Impact joining strength (KJ/m$^2$) | D 2.7 | B 7.5 | B 7.2 | | |
|  | Out-of-plane tensile Joining strength (MPa) | C 32.1 | D 28.9 | D 29.4 | | |
|  | Position of structural component [C] | Surface | Surface | Surface | — | Surface + Interlaminar |
|  | Interlaminar fractural toughness $G_{IC}$ (KJ/m$^2$) | — | — | — | 0.6 | 0.7 |
|  | Interlaminar fractural toughness $G_{IIC}$ (KJ/m$^2$) | — | — | — | 1.2 | 2.7 |

DESCRIPTION OF REFERENCE SIGNS

1: One layer forming prepreg or laminate
2: Structural component [A]
3: Structural component [C] and structural component [B], or structural component [C] and structural component [D]
4: Axial direction of any fiber bundle
5: Cross-section to be observed
6: Structural component [A]
7: Resin area including structural component [C]
8: Resin area including structural component [B] or resin area including structural component [D]
9: Observation image
10: Interface
11: Baseline
12: Vertical baseline
13: Cross-sectional curve

The invention claimed is:

1. A prepreg comprising the following structural components [A], [B], and [C], wherein
all epoxy resins included in [B] have an average epoxy value of 2.0 meq./g or more and 5.0 meq./g or less, [C] is present in a surface of the prepreg, and
reinforcing fibers [A] are present, which are included in a resin area including [B] and a resin area including [C] across an interface between the two resin areas:
[A] reinforcing fibers;
[B] an epoxy resin; and
[C] a thermoplastic resin,
wherein, in a planar view, when a cross-section vertical to a plane of the prepreg including [A] is obtained from a direction of an angle different by 45 degrees to a direction of any fiber [A] included in the two resin areas, a cross-sectional curve, formed by the interface between the two resin areas closely adhering to each other, in the cross-section, has an average roughness length RSm, defined in accordance with JIS B0601 (2001), of 100 μm or less, and an average roughness height Rc of 3.5 μm or more, and wherein the resin area including [B] and the resin area including [C] are adjacent to each other in a layered state to form the interface.

2. The prepreg according to claim 1, wherein the all epoxy resins included in the structural component [B] have an average epoxy value of 2.5 meq./g or more and 4.0 meq./g or less.

3. The prepreg according to claim 1, wherein the structural component [B] includes a bisphenol type epoxy resin having an epoxy equivalent of 400 or more and 3000 or less in an amount of 20 parts by mass or more and 50 parts by mass or less based on 100 parts by mass of the all epoxy resins included therein.

4. The prepreg according to claim 3, wherein the structural component [B] includes a bisphenol type epoxy resin having an epoxy equivalent of 1000 or more and 3000 or less in an amount of 20 parts by mass or more and 50 parts by mass or less based on 100 parts by mass of the all epoxy resins included therein.

5. The prepreg according to claim 1, wherein the structural component [B] has a bending fractural strain of 8% or more in a state in which a degree of cure is 90% or more.

6. The prepreg according to claim 1, wherein the structural component [A] includes a carbon fiber having a strand tensile strength of 5.5 GPa or more.

7. The prepreg according to claim 1, wherein the average roughness height Rc is 10 μm or more.

* * * * *